US009346491B1

(12) United States Patent
Wurzer et al.

(10) Patent No.: US 9,346,491 B1
(45) Date of Patent: May 24, 2016

(54) DECK PLATE FOR A TRUCK CHASSIS

(71) Applicants: Adam J. Wurzer, Carroll, IA (US);
Terry D. Wurzer, Panora, IA (US);
David T. Wurzer, Carroll, IA (US)

(72) Inventors: Adam J. Wurzer, Carroll, IA (US);
Terry D. Wurzer, Panora, IA (US);
David T. Wurzer, Carroll, IA (US)

( * ) Notice: Subject to any disclaimer, the term of this patent is extended or adjusted under 35 U.S.C. 154(b) by 0 days.

(21) Appl. No.: 14/836,268

(22) Filed: Aug. 26, 2015

(51) Int. Cl.
*B62D 21/09* (2006.01)
*B62D 21/10* (2006.01)
*B62D 33/02* (2006.01)
*B62D 25/20* (2006.01)

(52) U.S. Cl.
CPC ............... *B62D 21/09* (2013.01); *B62D 21/10* (2013.01); *B62D 33/02* (2013.01); *B62D 25/2054* (2013.01)

(58) Field of Classification Search
CPC ............... B60J 7/08; B60J 7/106; B60J 7/16; B62D 21/09; B62D 21/10; B62D 25/20; B62D 25/2027; B62D 25/2054; B62D 33/02
USPC .......................................... 296/184.1, 193.07
See application file for complete search history.

(56) References Cited

U.S. PATENT DOCUMENTS 6,793,272 B2 * 9/2004 Borugian ............... B62D 63/04
296/184.1
7,806,465 B2 * 10/2010 Burchett ................ B62D 21/12
296/184.1

* cited by examiner

*Primary Examiner* — Jason S Daniels
(74) *Attorney, Agent, or Firm* — Dennis L. Thomte; Thomte Patent Law Office LLC

(57) ABSTRACT

A deck plate assembly is provided for mounting between the first and second frame members of a truck. The assembly includes a horizontally disposed deck plate which is positioned between the first and second frames. Structure is provided for securing the deck plate to the first and second frame members.

7 Claims, 6 Drawing Sheets

DECK PLATE FOR A TRUCK CHASSIS

BACKGROUND OF THE INVENTION

1. Field of the Invention

This invention relates to a deck plate for attachment to the first and second longitudinally extending frame members of a truck chassis which is positioned thereon between the rearward end of the truck cab and fifth wheel of the truck. More particularly, this invention relates to a unique method of attaching the deck plate to the first and second frame members. Even more particularly, the deck plate includes a unique structure which permits cables, hoses, wires, etc., to extend upwardly through the deck plate for connection to the trailer being pulled by the truck.

2. Description of the Related Art

Semi-trailer trucks or tractors have long been used to pull trailers by way of a fifth wheel hitch structure. The truck or tractor usually has a frame or chassis which has steering wheels at the forward end thereof, drive wheels at the rearward end thereof, an engine, a cab, and a fifth wheel hitch structure at the rearward end of first and second longitudinally extending frame members which are exposed between the rearward end of the cab and the fifth wheel hitch. When a trailer is hitched to the fifth wheel structure of the truck, the front of the trailer is positioned rearwardly of the rearward end of the cab.

As the truck pulls the trailer over the road, debris such as gravel, mud, dirt, road de-icer, etc. is thrown upwardly between the first and second frame members onto the underside of the trailer and also onto the rearward side of the cab. If the truck is not pulling a trailer, the debris is thrown upwardly through the first and second frame members into the air and also onto the rearward side of the cab.

It is believed that attempts have been made to position a deck or plate onto the upper ends of the first and second frame member behind the cab but it is believed that those deck plates are difficult to install and are difficult to maintain.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The deck plate assembly of this invention is designed to be secured to a truck chassis between longitudinally extending first and second frame members which extend rearwardly from the cab of the truck to a fifth wheel structure on the frame. A plurality of spaced-apart cross-members extend between the first and second frame members between the cab of the truck and the fifth wheel structure.

A horizontally disposed and rectangular deck plate is positioned between the first and second frame members between the cab and the fifth wheel structure. Mounting clips are secured to the sides of the deck plate and have outer ends which are positioned beneath the upper flanges of the frame members. Elongated support members are secured to some of the cross-members and extend upwardly therefrom so that the upper ends thereof are positioned below the deck plate. The support members limit the downward movement of the deck plate with respect to the first and second frame members. The mounting clips limit the upward movement of the deck plate with respect to the first and second frame members.

It is therefore a principal object of the invention to provide a deck plate assembly for a truck chassis.

A further object of the invention is to provide a deck plate which is positioned between the frame members of the truck between the rear end of the cab of the truck and the forward end of the fifth wheel structure thereon.

A further object of the invention is to provide a unique way of mounting the deck plate to the truck chassis.

A further object of the invention is to provide an invention of the type described which enables a deck plate to be easily secured to the frame members of the truck chassis.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
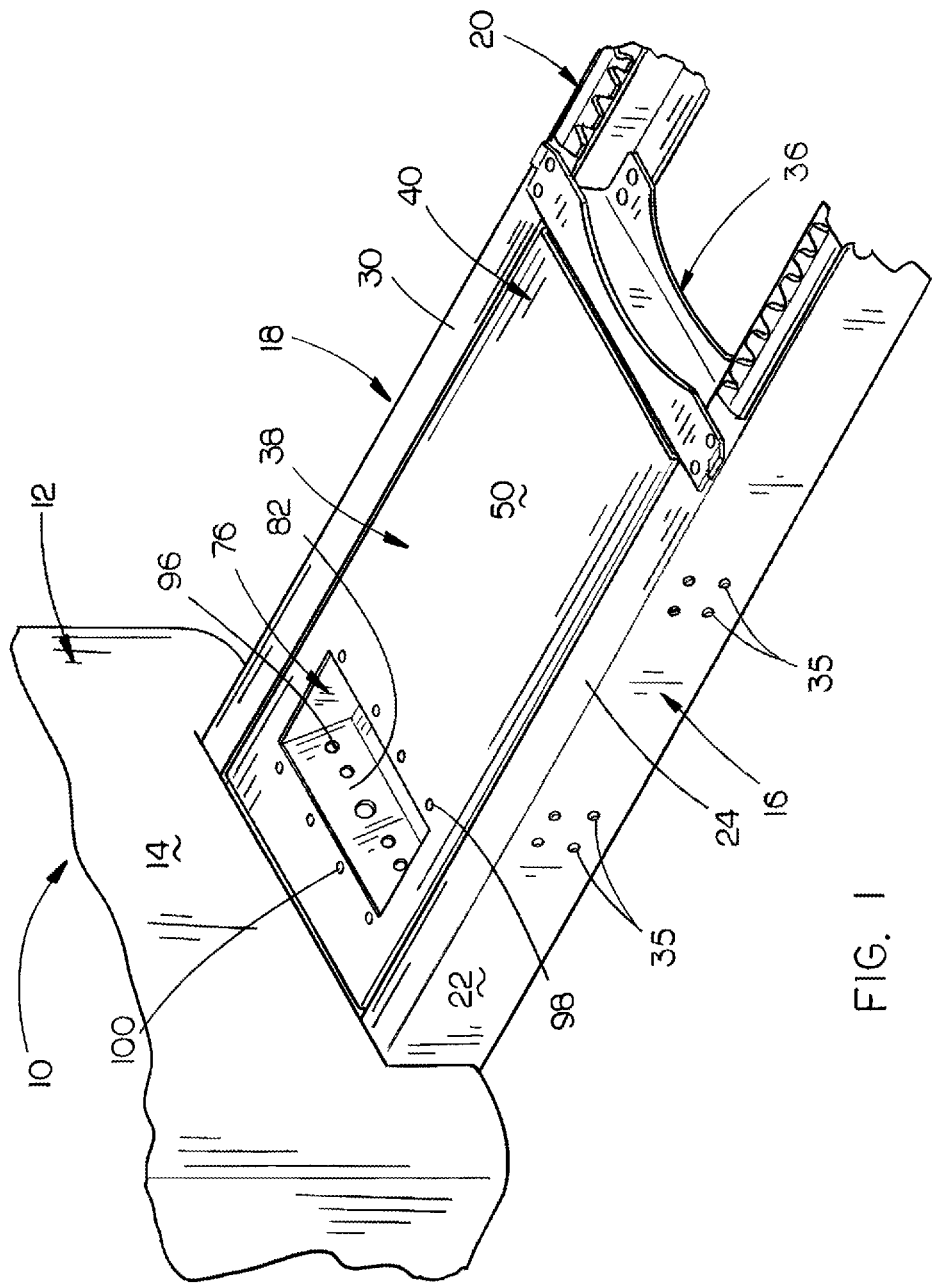
FIG. 1 is a partial perspective view illustrating the deck plate of this invention positioned between the frame members of a truck chassis.

The numeral 10 refers to a conventional semi-truck or trailer which includes a cab 12 having a rearward side 14. Truck 10 includes first and second longitudinally extending frame members 16 and 18 which extend rearwardly from the forward end of the truck to a fifth wheel hitch structure 20. Frame members 16 and 18 are conventional in design. Frame member 16 includes a vertically disposed web portion 22, an upper flange 24 and a lower flange 26. Frame member 18 includes a vertically disposed web portion 28, an upper flange 30, and a lower flange 32. A plurality of horizontally disposed cross-members 34 are secured to the frame members 16 and 18 in conventional fashion and are spaced-apart. Normally, a cross-member 36 extends between frame members 16 and 18 just forwardly of the fifth wheel structure 20 as seen in FIG. 1. It is the area between the frame members 16 and 18 from the rear of the cab 12 to the fifth wheel structure 20 that the debris will pass upwardly therethrough.

Figure 2:
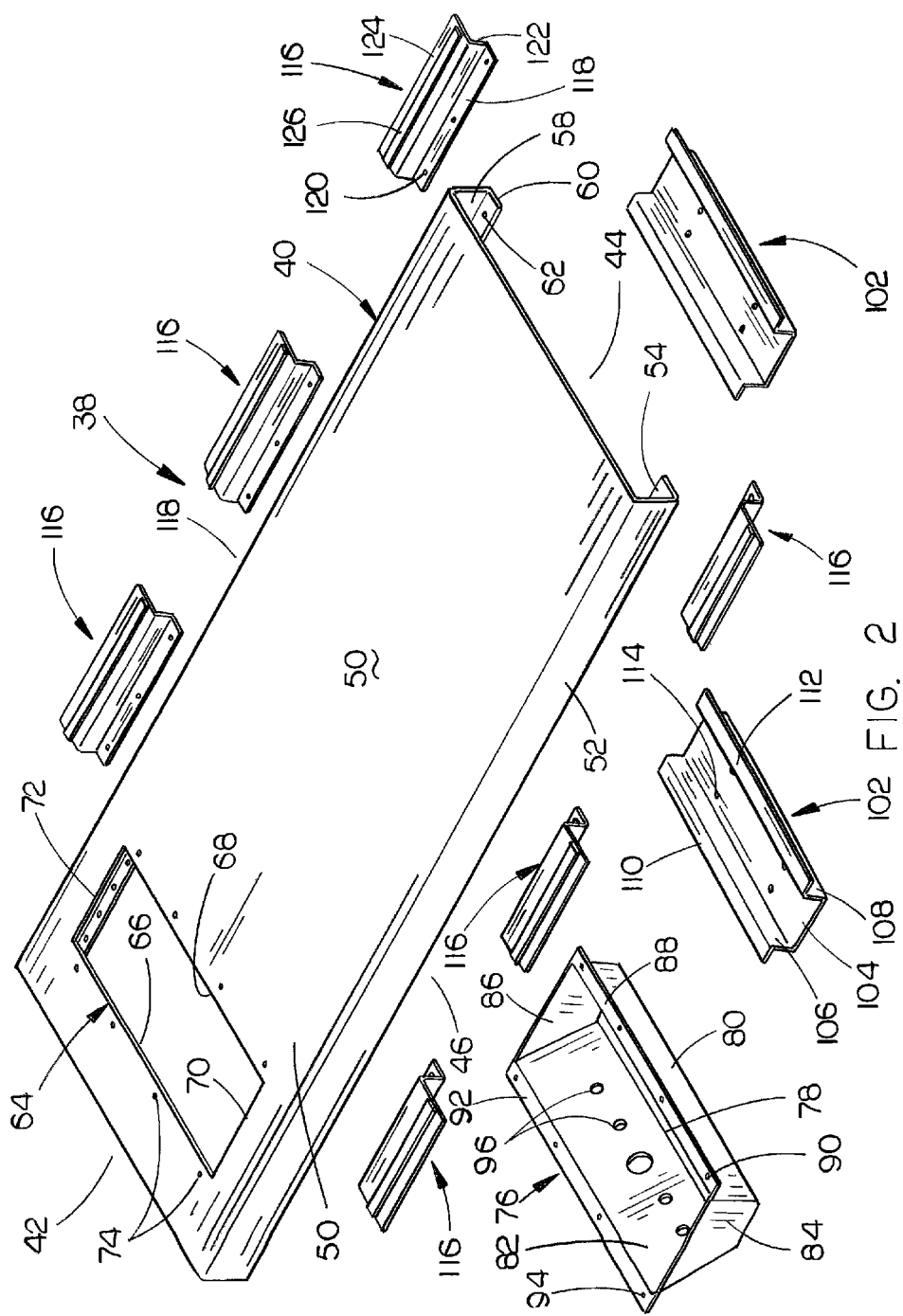
FIG. 2 is an exploded perspective view of the deck plate assembly of this invention.

The deck plate assembly of this invention is referred to generally by the reference numeral 38. Deck plate assembly 38 includes a horizontally disposed deck member 40 which is preferably constructed of a metal material such as aluminum. Deck member 40 will be described as having a forward end 42, a rearward end 44, a left or first side 46 and a right or second side 48. Deck member 40 includes a central portion 50. A side wall 52 extends downwardly from the left side of central portion 50 as seen in FIG. 2. A horizontally disposed flange 54 extends horizontally inwardly from the lower end of side wall 52 and has a plurality of spaced-apart bolt openings 56 formed therein.

Figure 3:
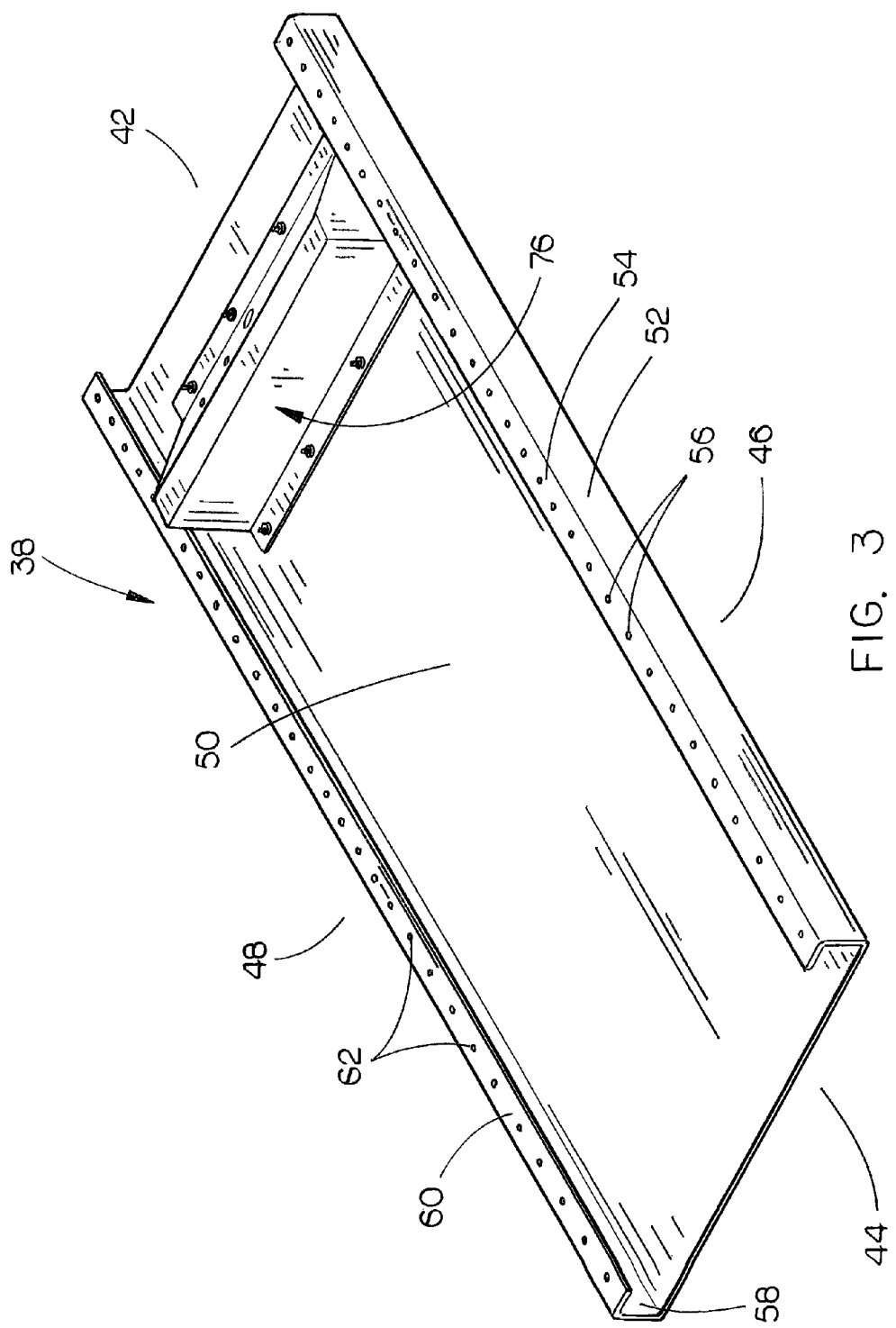
FIG. 3 is a bottom perspective view of the deck plate of this invention.
Figure 4:
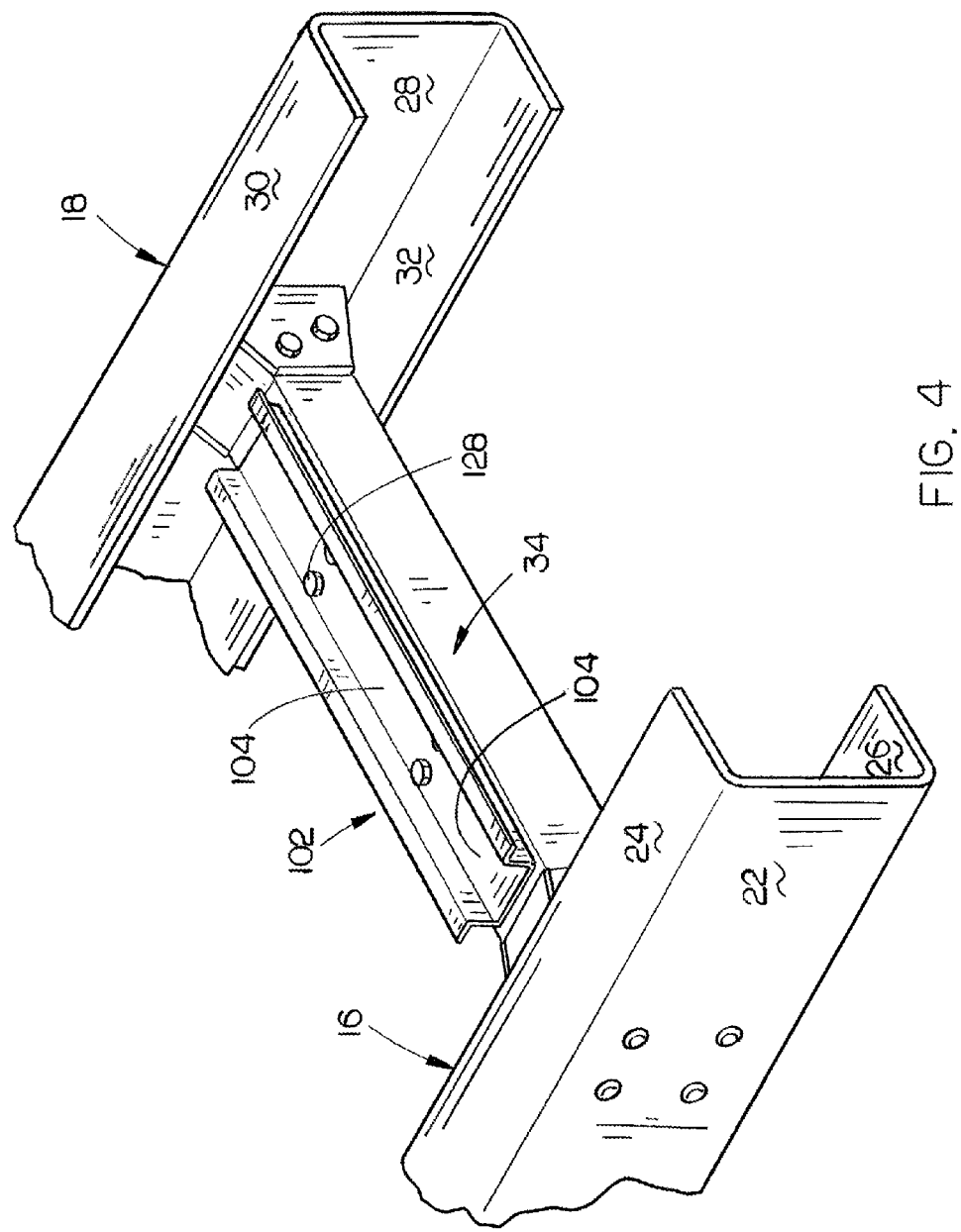
FIG. 4 is a partial perspective view illustrating a support member secured to a cross-member of the truck chassis.
Figure 5:
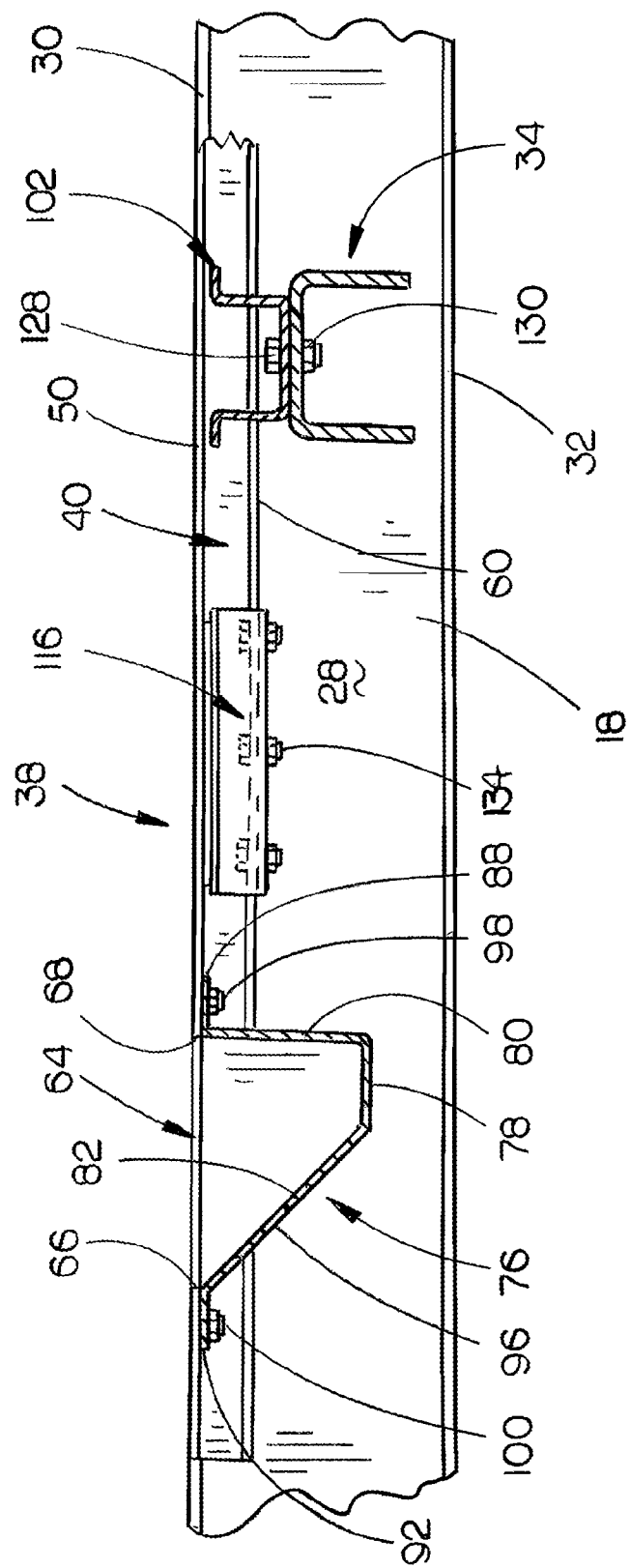
FIG. 5 is a partial sectional view illustrating the deck plate of this invention mounted on truck chassis.

A side wall 58 extends downwardly from the right side of central portion 50 as seen in FIGS. 2 and 3. A horizontally disposed flange 60 extends horizontally inwardly from the lower end of side wall 58 and has a plurality of spaced-apart bolt openings 62 formed therein.

Central portion 50 has a rectangular opening 64 formed therein rearwardly of the forward end 42 thereof. For purposes of description, opening 64 will be described as having a forward end 66, a rearward end 68, a left side 70, and a right side 72. Bolt openings 74 are formed in central portion 50 at the forward and rearward ends of opening 64 as seen in FIG. 2.

The numeral 76 refers to a box which is positioned in opening 64. Box 76 includes a horizontally disposed bottom wall 78, an upstanding rear wall 80 which extends upwardly from the rear end of bottom wall 78, an inclined front wall 82 which extends upwardly and forwardly from the front end of bottom wall 78, a first end wall 84 and a second end wall 86. A mounting flange 88 extends rearwardly from the upper end of rear wall 80 and has a plurality of spaced-apart bolt openings 90 formed therein. A mounting flange 92 extends forwardly from the upper end of front wall 82 and has a plurality of spaced-apart bolt openings 94 formed therein. Front wall 82 has a plurality of openings 96 formed therein.

Box 76 is positioned beneath deck member 40 so that the bolt openings 90 in flange 88 register with the bolt openings 74 at the rearward end 68 of opening 64 and so that the bolt openings 94 in flange 92 register with the bolt openings 74 at the forward end of opening 64. Bolts 98 secure flange 88 to deck member 40 and bolts 100 secure flange 92 to deck member 40.

The numeral 102 refers to an elongated support member or stabilizer member which includes a horizontally disposed bottom wall 104, upstanding walls 106 and 108, and flanges 110 and 112 at the upper ends of walls 106 and 108 respectively. Bottom wall 104 has a plurality of bolt openings 114 formed therein.

The support member 102 is designed to be secured to one of the cross-members 34 so as to be parallel thereto. Although the drawings illustrate only two support members 102, many installations will require three support members 102 since there may be three cross-members 34 beneath the deck member 40.

FIG. 2 illustrates a plurality of mounting clips 116 which are utilized in the invention. Since all the mounting clips 116 are identical, only one of the mounting clips 116 will be described in detail. Each of the mounting clips 116 include a lower horizontally disposed flange 118 having bolt openings 120 formed therein. Clip 116 also includes a vertically disposed wall 122 which extends upwardly from flange 118. An upper flange 124 extends horizontally from the upper end of wall 122. Preferably, the upper surface of flange 124 has a tape strip 126 positioned thereon.

The deck plate assembly 38 is mounted on the frame members 16 and 18 between the rearward end 14 of the cab 12 as will now be described. A support member 102 is positioned on each of the upper ends of the cross-members 34. Bolts 128 are extended downwardly through the bolt openings 114 in the support member 102, and through bolt openings 130 formed in the associated cross-member 34. Nuts 132 are secured to the lower ends of bolts 128.

The deck member 40 is then inserted downwardly between the frame members 16 and 18 as illustrated in the drawings. The flanges 110 and 112 of the support members 102 limits the downward movement of the deck member 40 between the frame members 16 and 18 so that the upper surface of the deck member 40 is substantially at the same level as the upper ends of the frame members 16 and 18.

Figure 6:
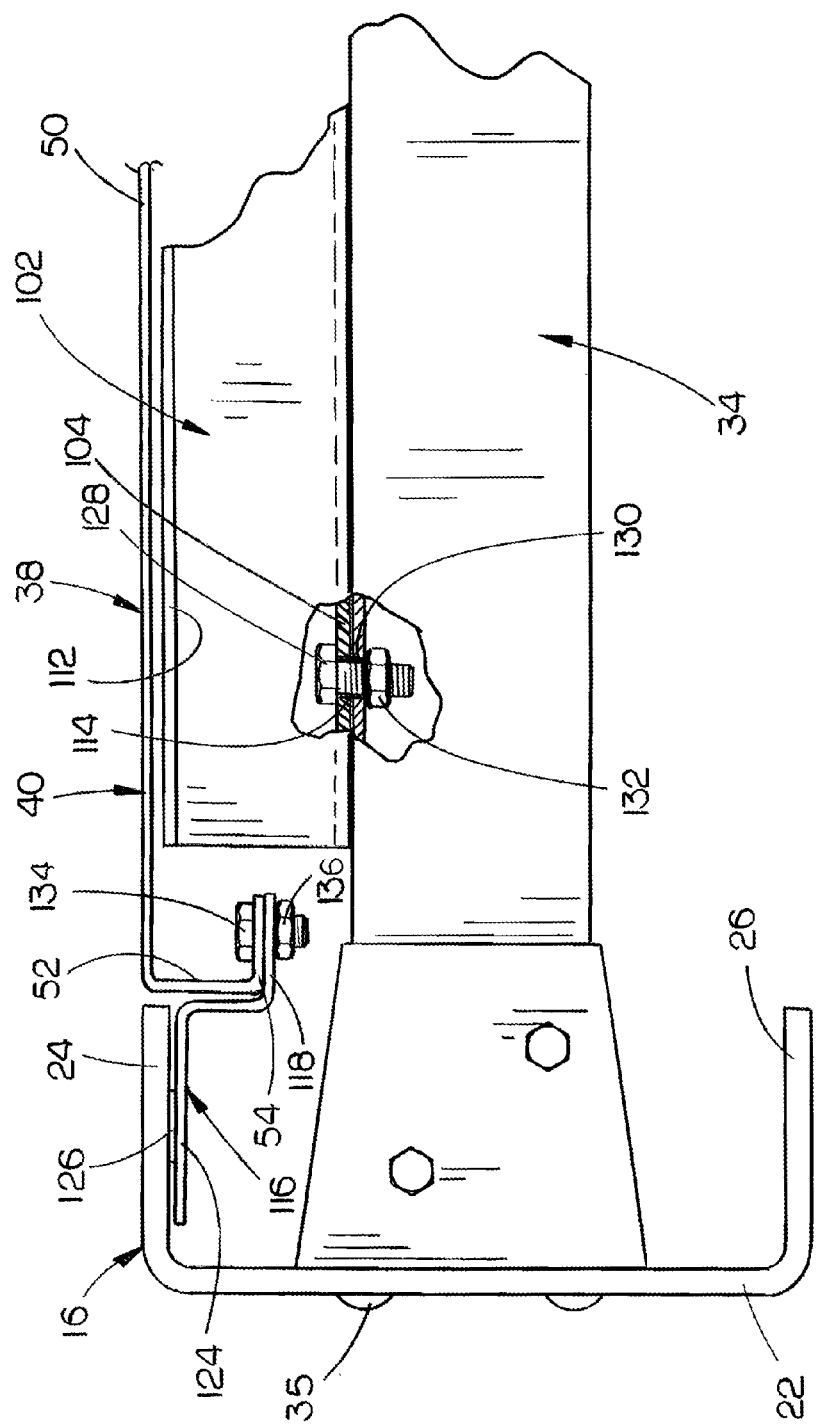
FIG. 6 is a partial sectional view illustrating the manner in which the deck plate is supported upon the cross-members of the truck chassis and the manner in which the deck plate is positioned between the frame members.

The mounting clips 116 are then positioned as seen in FIG. 6 so that the upper flange 124 thereof is positioned below the upper flange 24 of frame member 16 and so that the lower flange 118 is positioned below flange 54 of deck member 40 as seen in FIG. 6. Bolts 134 are then extended downwardly through bolt openings 56 in flange 54, through bolt openings 120 in clip 116 and secured thereto by nuts 136.

The same procedure is followed for all the mounting clips 116 and the left side 46 of deck member 40. The mounting clips 116 at the right side of deck member are positioned and installed in the same fashion as just described with the lower flanges 118 of those mounting clips being positioned below the flange 60 of deck member 40 and with the upper flanges 124 of those mounting clips 116 being positioned below the upper flange 30 of frame member 18. Bolts secure the flanges 54 and 118.

Thus, the support members 102 limit the downward movement of deck member 40 with respect to the frame members 16 and 18 and the mounting clips 116 limit the upward movement of the deck member 40 with respect to frame members 16 and 18. The deck member 40 not only provides a platform for a person to stand upon but prevents debris from passing upwardly between frame members 16 and 18 between the cab 12 and the fifth wheel structure 20.

The box 76 is optional but is highly recommended. The wires, cables, hoses, etc., which connect the truck 10 to the trailer secured to the fifth wheel structure 20 pass upwardly and rearwardly through the openings 96 in front wall 82 of box 76 for conventional connection to the trailer brakes, lights, etc.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A deck plate assembly for a truck chassis including longitudinally extending first and second frame members having forward and rearward ends with a cab positioned at the forward ends of the first and second frame members and a fifth wheel structure positioned at the rearward ends of the first and second frame members, with each of the first and second frame members having a horizontally disposed upper flange, with inner and outer ends, a web, having upper and lower ends, extending downwardly from the outer end of the upper flange, and a horizontally disposed lower flange with inner and outer ends, extending inwardly from the lower end of the web, and with a plurality of horizontally disposed cross-members secured to the first and second frame members and extending therebetween, the deck plate assembly comprising:
- a horizontally disposed rectangular deck plate having a forward end, a rearward end, a first side and a second side;
- a vertically disposed first side wall, having upper and lower ends, which extends downwardly from said first side of said deck plate between said forward and rearward ends thereof;
- a horizontally disposed first flange, having inner and outer ends, extending inwardly from said lower end of said first side wall;
- said first flange having a plurality of spaced-apart bolt openings formed therein;
- a vertically disposed second side wall, having upper and lower ends, which extends downwardly from said second side of said deck plate between said forward and rearward ends thereof;
- a horizontally disposed second flange, having inner and outer ends, extending inwardly from said lower end of said second side wall;
- said second flange having a plurality of spaced-apart bolt openings formed therein;
- an elongated and horizontally disposed support member, having upper and lower ends, secured to at least two of the cross-members so as to extend upwardly therefrom;
- said deck plate configured to be positioned between the first and second frame members above said support members with said support members limiting the downwardly movement of said deck plate with respect to said first and second frame members;
- a plurality of first mounting clips having inner and outer ends;
- said inner ends of said first mounting clips being secured to said first flange of said deck plate;
- said outer ends of said first mounting clips being positioned beneath the upper flange of the first frame member so as to limit the downward movement of said first side of said deck plate with respect to said first frame member,
- a plurality of second mounting clips having inner and outer ends;
- said inner ends of said second mounting clips being secured to said second flange of said deck plate; and
- said outer ends of said second mounting clips being positioned beneath the upper flange of the second frame member so as to limit the downward movement of said second side of said deck plate with respect to said second frame member.

2. The deck plate assembly of claim 1 wherein said inner and outer ends of each of said first and second mounting clips are connected by a vertically disposed clip portion.

3. The deck plate assembly of claim 1 wherein said outer ends of said first and second mounting clips have upper and lower surfaces and wherein a strip of tape is positioned on said upper surfaces of said outer ends of said mounting plates.

4. The deck plate assembly of claim 1 wherein said deck plate has an upper surface which dwells in substantially same plane as the upper flanges of the first and second frame members.

5. The deck plate assembly of claim 1 wherein said deck plate has a rectangular opening formed therein rearwardly of said forward end thereof and wherein a box is positioned in said rectangular opening which extends downwardly from said rectangular opening and wherein said box includes a front wall having a plurality of openings formed therein to permit wires or hoses or cables to extend rearwardly therethrough.

6. The deck plate assembly of claim 5 wherein said front wall of said box is inclined and has upper and lower ends with said upper end of said front wall being positioned forwardly of said lower end of said box.

7. A deck plate assembly for a truck chassis including longitudinally extending first and second frame members having forward and rearward ends with a cab positioned at the forward ends of the first and second frame members and a fifth wheel structure positioned at the rearward ends of the first and second frame members, with each of the first and second frame members having a horizontally disposed upper flange, with inner and outer ends, a web, having upper and lower ends, extending downwardly from the outer ends of the upper flange, and a horizontally disposed lower flange with inner and outer ends, extending inwardly from the lower end of the web, and with a plurality of horizontally disposed cross-members secured to the first and second frame members and extending therebetween, the deck plate assembly comprising:
- a horizontally disposed rectangular deck plate having a forward end, a rearward end, a first side and a second side;
- said deck plate being positioned between the first and second frame members and being secured to the first and second frame members;
- a support member secured to at least two cross-members which extends upwardly therefrom to limit the downward movement of said deck plate with respect to the first and second frame members; and
- said first and second sides of said deck plate being secured to the first and second frame members in a manner which limits the upward movement of said deck plate with respect to the first and second frame members.

* * * * *